US008266153B2

(12) United States Patent
Hui et al.

(10) Patent No.: US 8,266,153 B2
(45) Date of Patent: Sep. 11, 2012

(54) DETERMINING AND DISPLAYING APPLICATION SERVER OBJECT RELEVANCE

(75) Inventors: Joseph Hui, Danville, CA (US); Walter Duell, Bavaria (DE); Hardy Eich, Munich (DE); Timothy Martin Huth, Vancouver (CA); Dmitri Smirnov, Munich (DE)

(73) Assignee: Oracle International Corporation, Redwood Shores, CA (US)

( * ) Notice: Subject to any disclaimer, the term of this patent is extended or adjusted under 35 U.S.C. 154(b) by 264 days.

(21) Appl. No.: 12/577,001

(22) Filed: Oct. 9, 2009

(65) Prior Publication Data

US 2011/0087672 A1   Apr. 14, 2011

(51) Int. Cl.
G06F 7/00 (2006.01)
G06F 17/30 (2006.01)
(52) U.S. Cl. ........................................ 707/748; 707/756
(58) Field of Classification Search .................. 707/756, 707/748
See application file for complete search history.

(56) References Cited

U.S. PATENT DOCUMENTS

| | | | | |
|---|---|---|---|---|
| 5,594,897 | A * | 1/1997 | Goffman | 707/999.102 |
| 6,012,053 | A * | 1/2000 | Pant et al. | 707/999.003 |
| 6,101,500 | A * | 8/2000 | Lau | 707/696 |
| 6,202,058 | B1 | 3/2001 | Rose et al. | |
| 6,529,948 | B1 * | 3/2003 | Bowman-Amuah | 709/217 |
| 7,062,756 | B2 | 6/2006 | Kamen et al. | |
| 7,076,611 | B2 | 7/2006 | Steere et al. | |
| 7,281,002 | B2 * | 10/2007 | Farrell | 707/999.003 |
| 7,630,972 | B2 * | 12/2009 | Ott et al. | 707/999.003 |
| 8,135,709 | B2 * | 3/2012 | Morton et al. | 707/728 |
| 2003/0014421 | A1 * | 1/2003 | Jung | 707/102 |
| 2003/0115176 | A1 * | 6/2003 | Bobroff et al. | 707/1 |
| 2006/0212449 | A1 | 9/2006 | Novy | |
| 2008/0288889 | A1 * | 11/2008 | Hunt et al. | 715/810 |
| 2009/0019036 | A1 | 1/2009 | Roy et al. | |

OTHER PUBLICATIONS

"Patrol for BEA WebLogic User Guide", Feb. 4, 2005, [online] [retrieved on Feb. 16, 2009], Retrieved from the Internet <URL: www.bmc.com/supportu/documents/25/08/52508/52508.pdf>.
Realtech, "Data Collector Suite for SAP", Sep. 8, 2005, [online] [retrieved on Feb. 16, 2009], Retrieved from the Internet <URL: www.realtech.com/wDeutsch/software/application_manager/Applications/SAP/SAP_DC_WP_EN.pdf>.
SilverStream Server, "Chapter 7 Maintaining the Server"[online] [retrieved on Feb. 11, 2009], Retrieved from the Internet <URL: http://www.novell.com/documentation/extendas 37/docs/helpcore/books/admMaintain.html>.

* cited by examiner

*Primary Examiner* — James Trujillo
*Assistant Examiner* — Pavan Mamillapalli
(74) *Attorney, Agent, or Firm* — Fliesler Meyer LLP

(57) ABSTRACT

In embodiments, the number of references to an object which is deployed into an application server framework may be determined by examining metadata extracted from configuration data sources within a multi-tier application framework. In embodiments, an object relevance value based on the extracted number of references to an object may be associated with the object. In embodiments, the number of references extracted from a data source may be weighted using a weight factor that is associated with the data source. In embodiments, the number of references to a source object may be extracted by traversing a source inheritance hierarchy and parsing the objects within the hierarchy. In embodiments, an object relevance display of a set of objects may be generated based in part on object relevance values of the set of objects. In embodiments, an object relevance display may be a molecular display, a flash tag cloud, and/or a source tree hierarchy.

18 Claims, 13 Drawing Sheets

DETERMINING AND DISPLAYING APPLICATION SERVER OBJECT RELEVANCE

COPYRIGHT NOTICE

A portion of the disclosure of this patent document contains material which is subject to copyright protection. The copyright owner has no objection to the facsimile reproduction by anyone of the patent document, as it appears in the Patent and Trademark Office patent file or records, but otherwise reserves all copyright rights whatsoever.

BACKGROUND

A. Technical Field

The present invention pertains generally to data analysis and display, and relates more particularly to determining and displaying relevance of objects.

B. Background of the Invention

Modern enterprise software applications typically are deployed onto a multi-tier (n-tier) client-server software architecture in which presentation, data processing, and data storage are logically separate processes. The most common implementation of an n-tier software architecture is the 3-tier architecture, where application integration, co-ordination, and processing are performed in the middle tier by a software application server and associated software components. The application server and associated software components in the middle tier may be called middleware, and the multi-tier software architecture may be called an application server framework.

Although a variety of application server framework implementations exist, the most common implementations are Java-based J2EE (Java 2 Enterprise Edition) application server frameworks in which the software components are implemented in the Java language. The enterprise applications that are deployed into a J2EE application server framework are implemented as associated sets of Java objects that provide application programming interfaces (APIs) to other applications for access to their services (i.e., their execution of tasks and/or functions). A deployed Java object can be considered to be a re-usable application building block that can participate in multiple types of associations to provide access to a variety of services.

A typical J2EE enterprise application framework hosts a large variety and number of deployed Java objects, and a key role of an application server is runtime management of deployed Java objects and the access to their interfaces. This runtime management is based on sets of configuration data files, which describe and define properties of the applications, objects, and interfaces that are currently deployed into the framework. Software application developers and enterprise architecture administrators are able to access framework runtime configuration data via displays provided by the application server administration console user interface (UI).

When a newly developed J2EE application is deployed, the associated objects and data components necessary to execute the application within the application framework are organized into a structured file hierarchy and packaged as a data archive. Examples of J2EE application data archives are JAR (Java ARchive), containing Java classes and associated data; WAR (Web ARchive), containing Java classes and other components, such as Java servlets and Java Server Pages (JSPs), used to execute web applications; and EAR (Enterprise ARchive), containing JAR and WAR files, used to execute enterprise applications. An application is deployed into an application server framework when its data archive is provided to the application server. The application server updates the framework configuration data to reflect the presence of the new application and enables runtime access to the application objects and interfaces.

Since application objects are meant to be re-usable, designing a new application will most likely include creating associations between at least some of the newly created application objects and objects that already are deployed into the framework. An application developer may use the application server UIs to identify the currently deployed objects, and the developer may make application design decisions based on which deployed objects are available for re-use. The choice of whether to re-use an object may be based on design usage patterns among the objects that already are deployed into the framework.

The application server UIs available to a developer typically display deployed objects alphabetically by name, deployment state (e.g., currently deployed), and/or object type. Since each deployed application contains many objects and many applications are hosted on a typical enterprise application framework, there may be a very large number of currently deployed objects being hosted by the application server at any given time. Design usage patterns among the objects are difficult to identify based on such an object listing displays. Current runtime configuration data also would not include design usage pattern information, since it is derived from the configuration files associated with the Java Virtual Machine (JVM). Discovery of design usage pattern information enables an application developer to design and develop new applications with optimal speed and efficiency.

SUMMARY OF THE INVENTION

In embodiments, the number of references to an object which is deployed into an application server framework may be determined by examining metadata extracted from configuration data sources within a multi-tier application framework. In embodiments, an object relevance value based on the extracted number of references to an object may be associated with the object. In embodiments, the number of references extracted from a data source may be weighted using a weight factor that is associated with the data source. In embodiments, the number of references to a source object may be extracted by traversing a source inheritance hierarchy and parsing the objects within the hierarchy. In embodiments, an object relevance display of a set of objects may be generated based in part on object relevance values of the set of objects. In embodiments, an object relevance display may be a molecular display, a flash tag cloud, and/or a source tree hierarchy.

In embodiments, a computer program product may provide a method for generating a stored relevance value of an object selected from a set of objects, and the method may comprise examining a set of metadata sources to determine a number of references to the object from each of the set of metadata sources; calculating a relevance value based on a number of references to the object determined from the set of metadata sources; and storing the relevance value in data storage. In embodiments, the set of objects is deployed to an application server framework, and the set of metadata sources are within the application server framework. In embodiments, the application server framework is a J2EE framework, and the set of metadata sources comprises database descriptors, application data framework (ADF) entity descriptors, runtime configuration descriptors, and source code.

In embodiments, the set of metadata sources is ranked according to one or more priority factors, and calculating the relevance value may comprise associating a weight factor with each of the set of metadata sources; calculating a weighted number of references for each of the metadata sources by multiplying the number of references determined from a metadata source by the weight factor associated with the metadata source; and calculating the relevance value based on a weighted number of references to the object determined from the set of metadata sources. In embodiments, the weight factor is retrieved from a stored weights template comprising the ranked set of metadata sources and their corresponding weight factors. In embodiments, the stored weights template is configurable.

In embodiments, the set of objects are source objects within an object inheritance hierarchy, the set of metadata sources are the source objects within the object inheritance hierarchy, and determining the number of references to a source object within the inheritance hierarchy comprises examining each of the source objects.

In embodiments, a computer processing system for generating an object relevance display may comprise an object ordering processor that receives an object relevance display request comprising a set of objects to display and, in response, retrieves a set of stored relevance values associated with the set of objects and sorts the set of objects according to their associated relevance values; and a display generator that generates the object relevance display in response to receiving the sorted set of objects. In embodiments, a relevance value is based on the number of references to an object, and the object relevance display comprises a set of icons representing the sorted set of objects and their associated relevance values.

In embodiments, the object relevance display request may further comprise a set of filtering parameters, and the object ordering processor selects a subset of objects to display based on the set of filtering parameters.

In embodiments, the set of object relevance display icons are graphic icons that indicate magnitudes of the relevance values corresponding to the sorted set of objects. In embodiments, magnitude of a relevance value is indicated by at least one attribute of a graphic object representing the object associated with the relevance value. In embodiments, HAS-A relationships among a subset of the displayed objects are identified by indicating connections between the graphic icons corresponding to the subset of the displayed objects.

In embodiments, the set of object relevance display icons are text icons that indicate magnitudes of the relevance values corresponding to the sorted set of objects, and the set of icons are displayed in a revolving cloud that is moved and rotated in response to interaction with a user.

In embodiments, the object relevance display is a tree hierarchy and the set of icons are text icons that are displayed in a list that is in descending order of magnitudes of the relevance values associated with the sorted set of objects.

In embodiments, a computer processing system for generating a stored relevance value associated with an object selected from a set of objects may comprise a metadata extractor that examines a set of metadata sources to determine a number of references to the object from each of the set of metadata sources; and a relevance value calculator that calculates a relevance value based on a number of references to the object determined from the set of metadata sources and stores the relevance value in data storage.

In embodiments, the metadata extractor may comprise an object entity parser that determines references to the object by analyzing metadata from an application data framework (ADF) entity; a descriptor parser that determines references to the object by analyzing metadata from runtime code configuration descriptors; a database parser that determines references to the object by analyzing metadata from a database configuration; and a source code parser that determines references to an object by analyzing metadata by parsing source code object definitions.

In embodiments, the set of metadata sources is ranked according to one or more priority factors, and calculating the relevance value may comprise associating a weight factor with each of the set of metadata sources; calculating a weighted number of references for each of the metadata sources by multiplying the number of references determined from a metadata source by the weight factor associated with the metadata source; and calculating the relevance value based on a weighted number of references to the object determined from the set of metadata sources. In embodiments, the weight factor is retrieved from a stored weights template comprising the ranked set of metadata sources and their corresponding weight factors.

In embodiments, the set of objects are source objects within an object inheritance hierarchy, and determining the number of references to a source object comprises examining the source objects within the object inheritance hierarchy.

Some features and advantages of the invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Figure 1A:
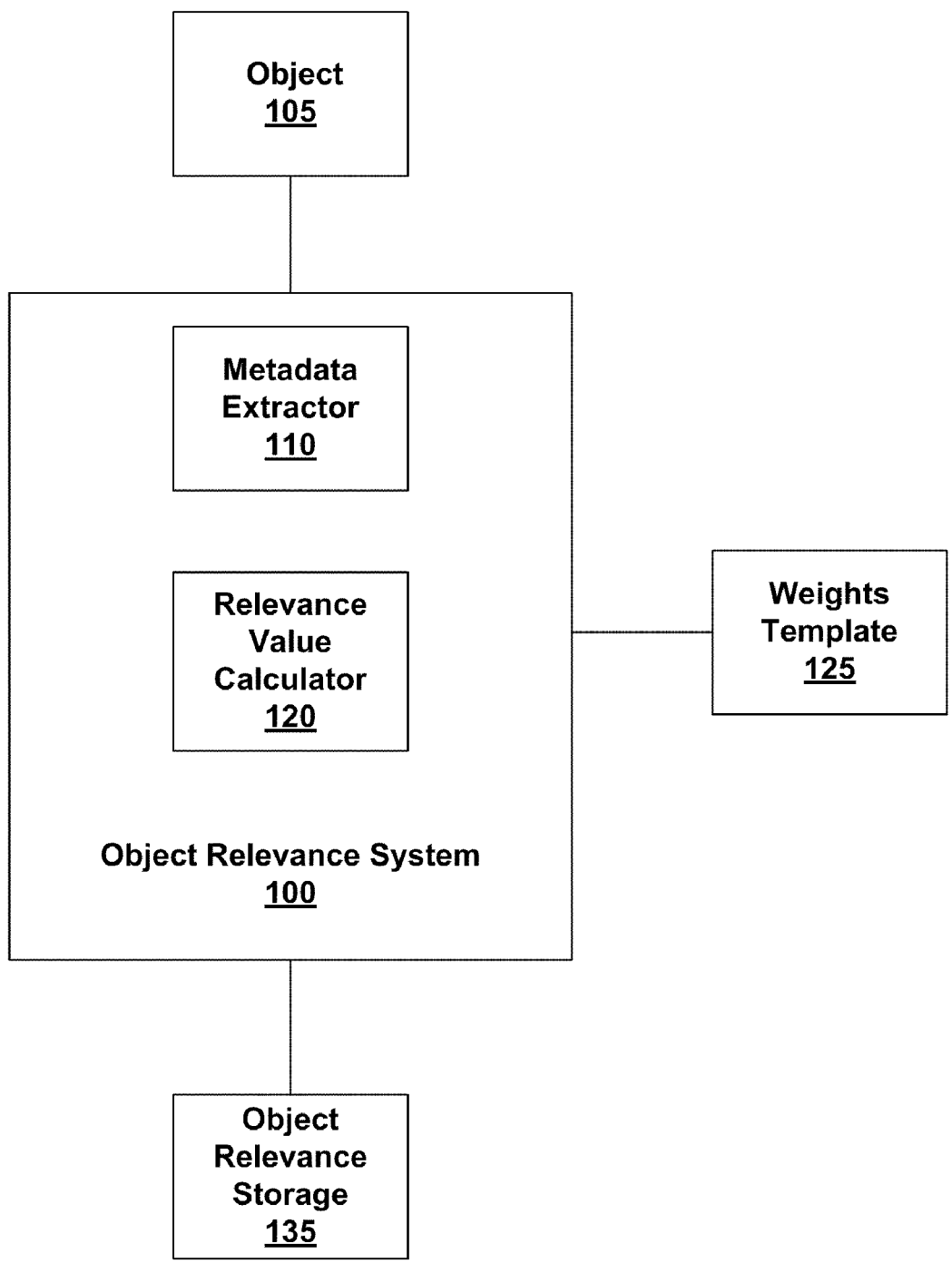
FIG. 1A depicts a block diagram of an object relevance system according to various embodiments of the invention.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, including software, hardware, or firmware, or combinations thereof. Accordingly, the figures described herein are illustrative of specific embodiments of the invention and are meant to avoid obscuring the invention.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component.

Furthermore, connections between components within the figures are not intended to be limited to direct connections. Rather, data between these components may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. The appearances of the phrases "in one embodiment," "in an embodiment," or "in embodiments" in various places in the specification are not necessarily all referring to the same embodiment or embodiments.

The use of certain terms in various places in the specification is for illustration and should not be construed as limiting. Usage of the term "service" is not limited to describing a single function; usage of the term also may refer to a grouping of related functions or functionality. Similarly, usage of the term "resource" is not limited to describing a single resource; the term also may be used to refer to a set of resources that may either be distributed or aggregated within a computing environment.

One specific application of the invention is its use in embodiments of J2EE application server frameworks. These embodiments will be described for illustrative purposes and not for limitation. Those skilled in the art shall recognize the general applicability of the present invention.

A. Object Relevance System

FIG. 1A depicts an object relevance system 100 for computing a relevance value for an object 105 deployed to an application server, and storing at least the relevance value associated with the object in data storage 135 according to various embodiments of the invention. Object relevance system 100 comprises a metadata extractor 110 and a relevance value calculator 120.

In embodiments, a new J2EE application module contains a set of Java objects that are associated to perform a set of services within a J2EE application framework. For example, a Person class object may be a fundamental component of a Human Capital Management (HCM) enterprise application suite, and a J2EE application developer may create a Person Module that creates, retrieves, updates, and deletes Person object instances. To deploy a new application module to an application server within a J2EE application server framework, the application objects (e.g., Java classes, Java servlets, Java Server Pages (JSPs)), their associated data, and associated configuration data files are packaged into a structured file hierarchy within an archive file format such as JAR, WAR, or EAR. The archive file is provided to the application server, which integrates the application module components into the application server framework so that they may be accessed and executed. Typically, integrating the application module into a J2EE application server framework includes updating at least a subset of the application server framework configuration data files that are managed by the application server. In various embodiments, object relevance system 100 may process a selected set of objects in an application module as part of the application deployment process. In alternate embodiments, object relevance system 100 may process a selected set of objects in a deployed application in response to a task request issued from another process, such as an interactive development environment (IDE). Those skilled in the art will recognize that implementation choices of an object relevance system 100 are not critical to the invention.

1. Metadata Extraction

In embodiments, metadata extractor 110 parses application server framework configuration data files to examine metadata in order to extract the number of references to an input object 105 within a deployed application module. In embodiments, metadata describing the references to an object that is deployed into a three-tier application server framework may be extracted from data configuration files that are associated with all three tiers of the framework (e.g., the data storage tier, the middle tier, and the presentation tier). For illustration and not for limitation, Table 1 depicts exemplary metadata sources (from which references may be extracted) within three exemplary configuration data categories according to various embodiments of the invention. Those having skill in the art will recognize that a variety of configuration data categories and metadata sources exist, and that the choice of configuration data category and/or metadata source is not critical to the invention.

TABLE 1

Exemplary metadata sources for extracting
references to a deployed object.

| Configuration Data Category | Metadata Source |
|---|---|
| Database | Foreign Keys |
| | Views |
| | Stored Procedures |
| ADF Entity | Enterprise Object (EO) Components |
| | Enterprise Object (EO) Associations |
| | View Object (VO) Components |
| | View Object (VO) View Links |
| Descriptor | Web Service usage (e.g. WSDL) |
| | User Interface usage (e.g. JSP and JSF) |
| Source Code | Web Service Implementation classes |
| | User Interface Implementation classes |
| | Plain source files |

Figure 1B:
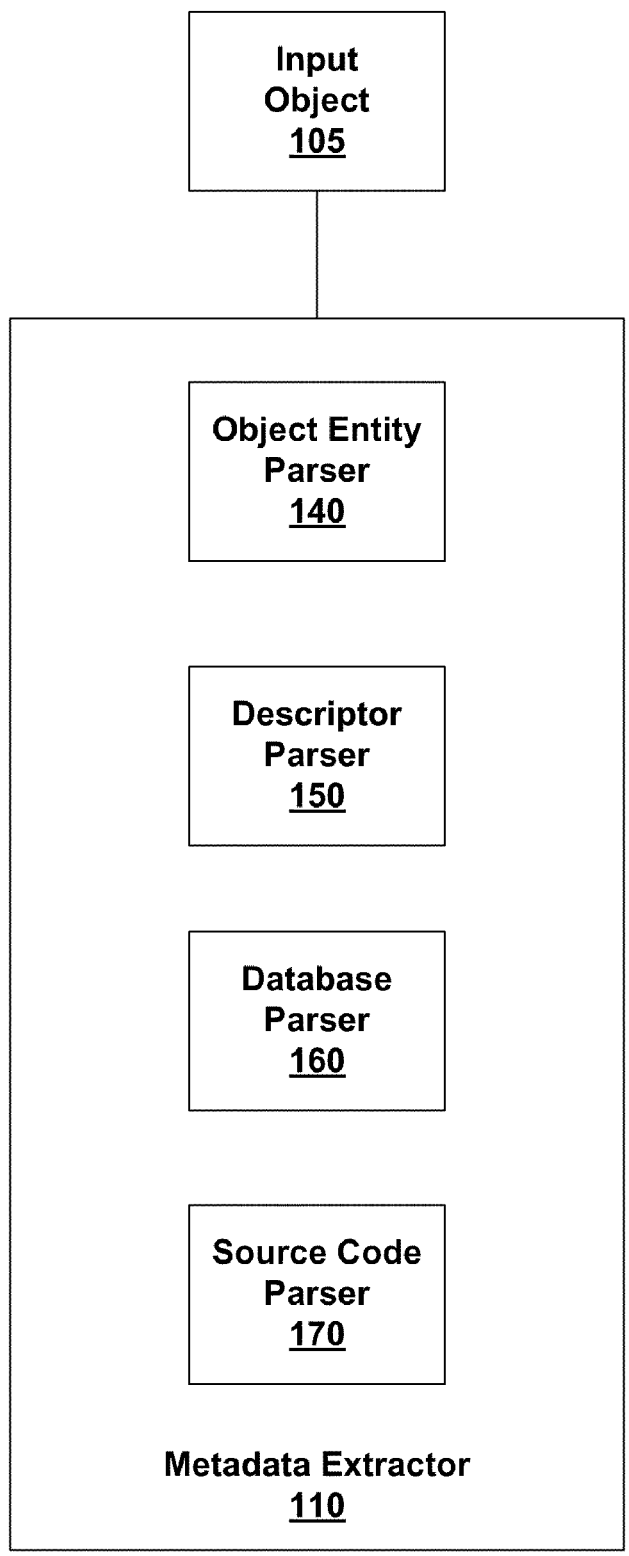
FIG. 1B depicts a block diagram of a metadata extractor according to various embodiments of the invention

FIG. 1B depicts a metadata extractor 110 that is a component of an object relevance system according to various embodiments of the invention. Metadata extractor 110 comprises a set of parsers, each of which is optimized to extract references to an object from configuration data.

In embodiments, object entity parser 140 determines references to an object by analyzing metadata from an application data framework (ADF) entity (i.e., an application object in an enterprise object framework (EOF)), such as enterprise object (EO) components, EO associations, and view object (VO) view links. It is well known to those skilled in the art that an enterprise application suite is associated with enterprise data that is stored within a database, and that there is a mapping between some of the application objects (components of an application object model) and their corresponding entities in the database schema. An EO is an application object that is mapped to a corresponding entity in a database schema. For example, the Person class object previously described within an HCM application is an EO that has a corresponding Person entity within the HCM database schema. An EO, which encapsulates business logic and rules, may be linked to one or more other EOs, and the relationship between two linked EOs is described as an EO Association object. A View Object (VO) is associated with an EO, and represents the information returned in response to a database query (i.e., the information associated with a database view). A VO may be linked to one or more other VOs, and the relationship between two linked VOs is described as a View Link object. Since EOFs are well known in the art, further discussion of EOF components is omitted here.

In embodiments, descriptor parser 150 determines references to an object by analyzing metadata from runtime code configuration descriptors, such as web service descriptors and user interface (UI) descriptors. It is well known in the art that web service interfaces are described declaratively using standard XML-based schemas, such as Web Services Description Language (WSDL), and that the interface descriptions are stored in data configuration files that are managed by an application server. A WSDL file is an exemplary web service interface descriptor. In embodiments, presentation of application data via a UI may be described declaratively using UI descriptors such as Java Server Pages (JSP) and Java Server Faces (JSF). It is well known to those skilled in the art that interface and UI presentation descriptions contain object references.

In embodiments, database parser 160 determines references to an object by analyzing metadata from a database configuration. In embodiments, references to an EO may be determined from database metadata such as the set of foreign keys associated with a relational database entity corresponding to the EO, view definitions that reference the relational database entity, and the text definition of stored procedures defined in the database which contain the relational database entity.

In embodiments, source code parser 170 determines references to other objects by parsing source code object definitions. Within a source code object definition file, references to other objects may be determined from direct references to other objects as variables as well as from class declarations (i.e., which class or classes the file extends). For example, the name of a base class (i.e., the parent class of the class being defined) follows the keyword extends in a Java class definition. Thus, the base class Person can be determined from parsing the class definition of its subclass Employee Java source file, which may state "public class Employee extends Person". References to other objects also may be found within the "import" section of a Java class source file or the "include" section of a C++ source file.

2. Object Relevance Calculation

In embodiments, relevance value calculator 120 receives input data comprising a set of extracted references to a deployed object 105, and identification of the corresponding set of metadata sources from which the references were extracted, and uses the input data to calculate a relevance value for that object. In embodiments, the input data may be received from an embodiment of metadata extractor 110.

As previously described, the set of metadata sources may be a set of configuration data within an application framework. In embodiments, the set of metadata sources may be prioritized and ranked, and each metadata source may be weighted (i.e., assigned a weight factor) based on its position within the rank order. In embodiments, a metadata source having a higher priority may be assigned a greater weight factor. In embodiments, the number of references extracted from a metadata source may be weighted by multiplying it by the weight factor that has been associated with the metadata source. In embodiments, the weight factor may be retrieved from a stored weights template 125 comprising a set of metadata sources and their associated weight factors. In embodiments, a default weights template 125 may be provided with an object relevance system 100 implementation, and, in alternate embodiments, the number, ranking, and/or associated weight factors of metadata sources within a weights template 125 may be configured and/or re-configured via an interface to the object relevance system 100 implementation. Table 2 depicts exemplary weight factors which may be associated with the metadata sources depicted in Table 1.

TABLE 2

Exemplary weight factors associated
with a set of metadata sources.

| Configuration Data Category | Metadata Source | Weight |
|---|---|---|
| Database | Foreign Keys | 20 |
| | Views | 10 |
| | Stored Procedures | 5 |
| ADF Entity | Enterprise Object (EO) Components | 25 |
| | Enterprise Object (EO) Associations | 20 |
| | View Object (VO) Components | 25 |
| | View Object (VO) View Links | 20 |
| Descriptor | Web Service usage (e.g. WSDL) | 10 |
| | User Interface usage (e.g. JSP and JSF) | 10 |
| Source Code | Web Service Implementation classes | 5 |
| | User Interface Implementation classes | 5 |
| | Plain source files | 5 |

In embodiments, the relevance value $R_{obj}$ associated with an object 105 is calculated as the sum of the references to the object that were extracted from a set of n metadata sources, according to the equation:

$$R_{obj} = ref_{m1} + ref_{m2} + \ldots + ref_{mn} \quad (1)$$

where $ref_{m1}$ is the number of references extracted from the metadata source m1, $ref_{m2}$ is the number of references extracted from the metadata source m2, and $ref_{mn}$ is the number of references extracted from the $n^{th}$ metadata source.

In various embodiments in which configuration data sources are weighted, the number of references extracted from a metadata source may be multiplied by a weight factor α associated with the metadata source (such as those depicted in Table 2), and the relevance value $R_{obj}$ associated with an object 105 may be calculated as the sum of the references to the object that were extracted from a set of n metadata sources according to the equation:

$$R_{obj} = \alpha_{m1} ref_{m1} + \alpha_{m2} ref_{m2} + \ldots + \alpha_{mn} ref_{mn} \quad (2)$$

where $\alpha_{m1}$ is the weight factor associated with the metadata source m1, $\alpha_{m2}$ is the weight factor associated with the metadata source m2, and $\alpha_{mn}$ is the weight factor associated with the $n^{th}$ metadata source.

It shall be noted that the calculation of the relevance value may take other forms including, without limitation, non-linear calculations.

3. Object Relevance Storage

In embodiments, the relevance value associated with an object may be stored in data storage 135, such as a database or data file system deployed on a storage medium, so that it is available for further processing and/or display. In embodiments, the relationship information among objects (e.g., HAS-A and IS-A relationships) also may be stored.

B. Object Relevance Display System

Figure 2:
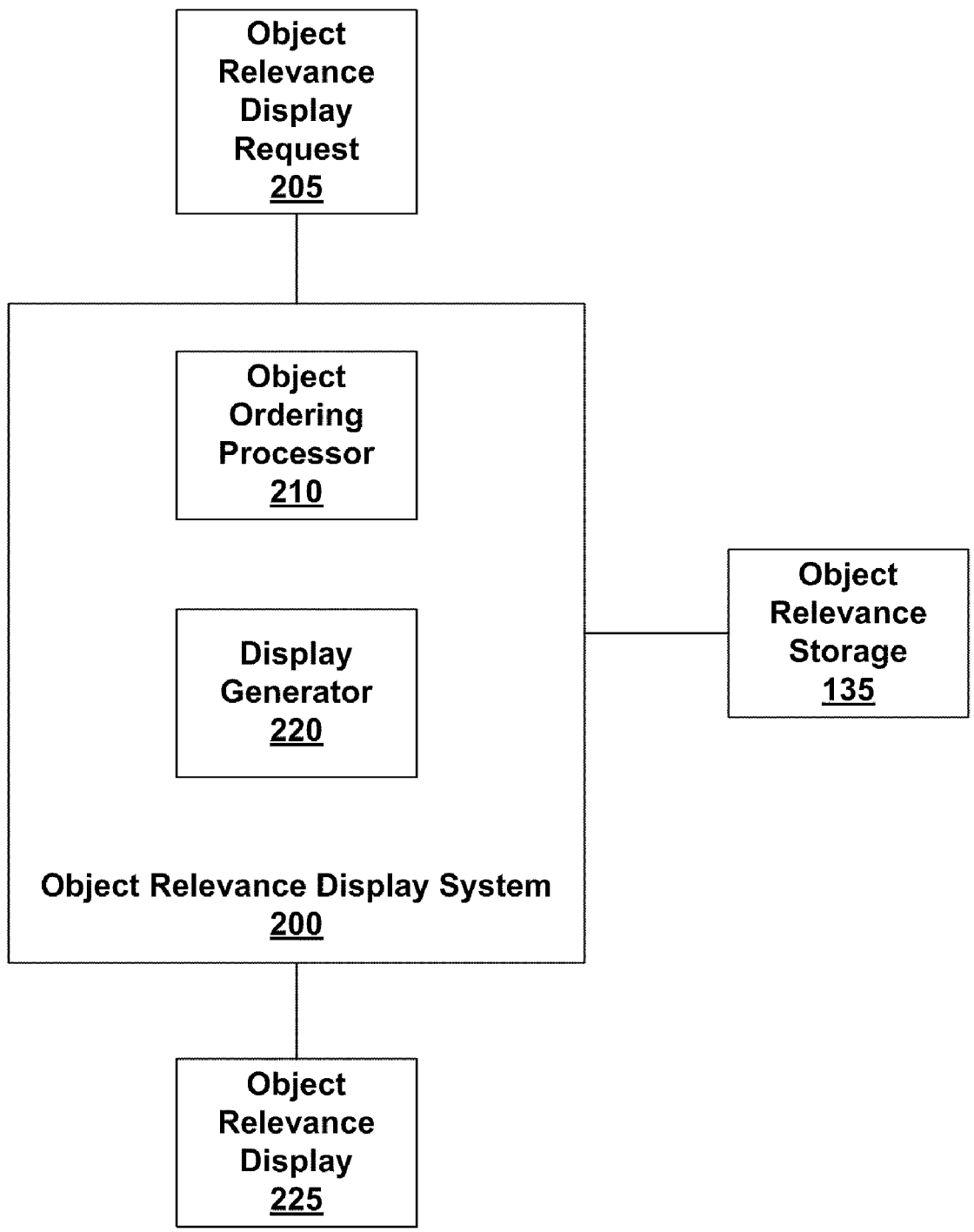
FIG. 2 depicts a block diagram of an object relevance display system according to various embodiments of the invention.

FIG. 2 depicts an object relevance display system 200 for generating an object relevance display 225 in response to an object relevance display request 205 according to various embodiments of the invention. Object relevance system 200 comprises an object ordering processor 210 and a display generator 220. In embodiments, object relevance display system 200 may be part of object relevance system 100.

In embodiments, an object relevance display request 205 may be received from a process within an enterprise software platform, such as an application server or an integrated development environment (IDE). In embodiments, the display request 205 specifies a set of one or more objects to be displayed. In various embodiments, the display request 205 may further specify a set of one or more filtering parameters which may be used to select a subset of objects of interest from the specified set of objects. As is well known in the art, there potentially are thousands of objects in an enterprise level application, and many of these objects are low level objects that do not have a bearing on identification of higher level application objects that may be available for re-use in application development. For example, there are many basic Java classes that are used throughout all Java applications (e.g., java.lang.String class in the java.lang package included within the J2SE (Java 2 Software Environment) class libraries supplied by Sun Microsystems, Inc. and used as the foundation for Java applications). It would be difficult for an application developer to discover relevant higher level application objects within an object relevance display that also includes the many references to such low level objects.

In embodiments, object ordering processor 210 retrieves a set of relevance values associated with the set of objects to be displayed from object relevance storage 135, and ranks and/or sorts the set of objects based on their associated relevance values. In embodiments, display generator 220 generates an object relevance display based on the ranked and/or sorted set of objects, their associated object relationship values, and their associated object relationship data. In embodiments, the object relationship data associated with the objects (such as HAS-A and IS-A relationships) may be retrieved from object relevance storage 135.

It is well known in the art that developing a new application for a J2EE application framework typically can involve re-using Java objects that already have been deployed into the J2EE application framework. For example, in developing the Person application module previously described, an application developer may create, delete, and/or modify instances of the Person class object, which already has been created and deployed within the HCM application framework. J2EE application objects are designed to be re-usable application building blocks, so, rather than define new objects, it is likely that the Person application developer also will create, delete, and/or modify instances of other deployed objects that are associated with the Person class object, such as other EOs, VOs, and their association objects. Since a typical enterprise application framework contains a very large number of deployed objects, discovering the subset of deployed objects available for re-use in a particular application becomes a difficult task for an application developer whose typical access to deployed objects is via an application server display of runtime data (e.g., all currently deployed objects listed alphabetically by name). Using such a display, an application developer could identify a deployed object possessing certain attributes only if the developer knew the object name and attributes beforehand. In contrast, an object relevance display 225, which indicates the relevance of each object based on the number of references to it as well as its relationships to other deployed objects, enables a developer to discover the most relevant deployed objects available for re-use.

In embodiments, an object within an object relevance display 225 may be represented by a graphic and/or text icon. In embodiments, an object relevance display 225 may be interactive, enabling a user to access additional information about an object by interacting with the icon representing the object. For example, information about an object's associated relevance value may be displayed in response to a user selecting the object icon using a mouse right button, and information about the object's attributes may be displayed in response to the user selecting the object icon using a mouse left button.

In various embodiments, an object relevance display may be a "flash tag cloud" display, in which text icons are displayed in a revolving cloud that can be moved and rotated in response to a user's interaction with the display. The relevance values of the objects may be indicated by displaying the object text icons in various combinations of font size, color, and/or boldness.

1. Molecular Object Relevance Display

Figure 3:
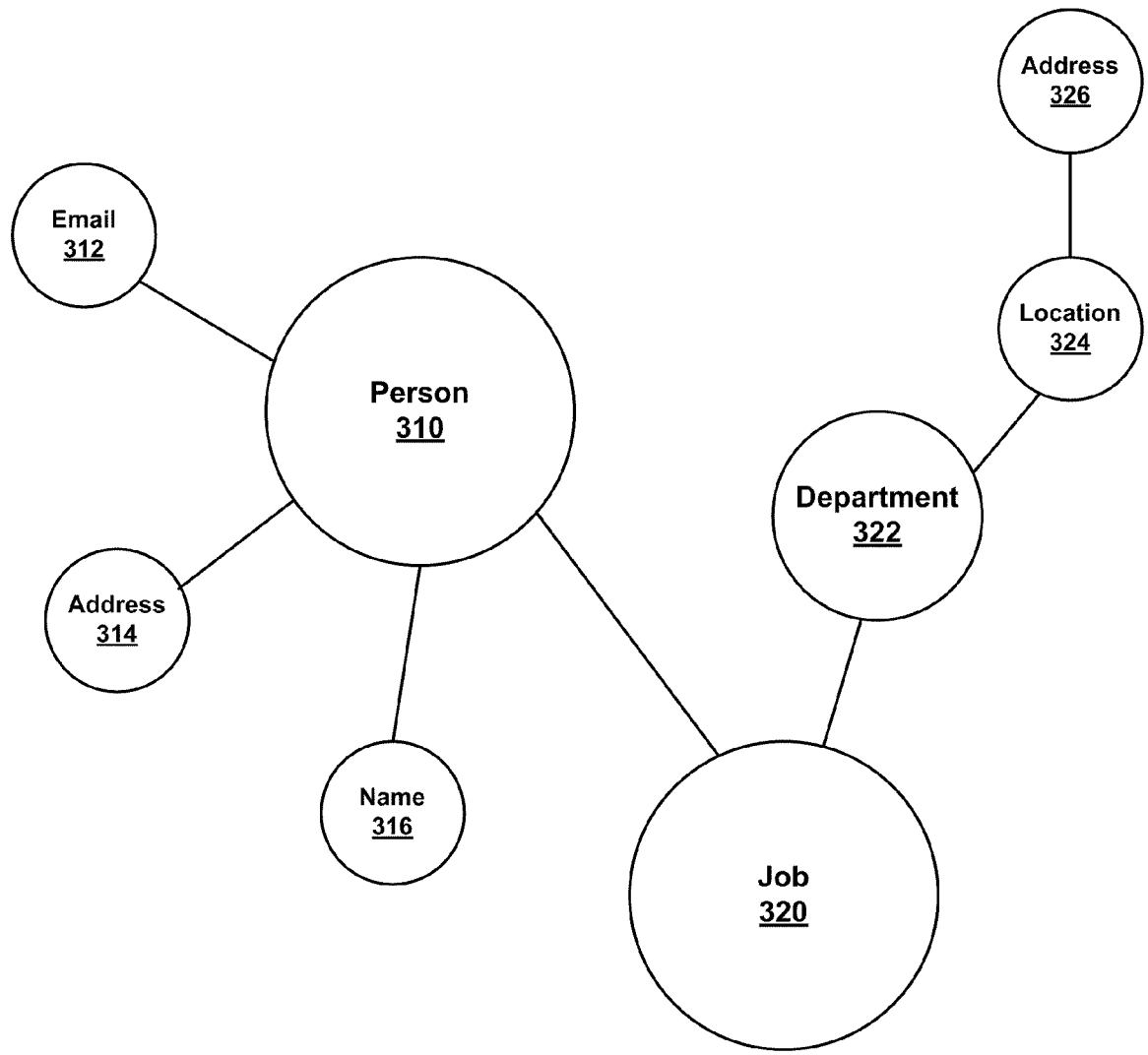
FIG. 3 illustrates a first exemplary view of a molecular object relevance display of a set of enterprise objects (EOs) from an exemplary Human Capital Management (HCM) application according to various embodiments of the invention.
Figure 4:
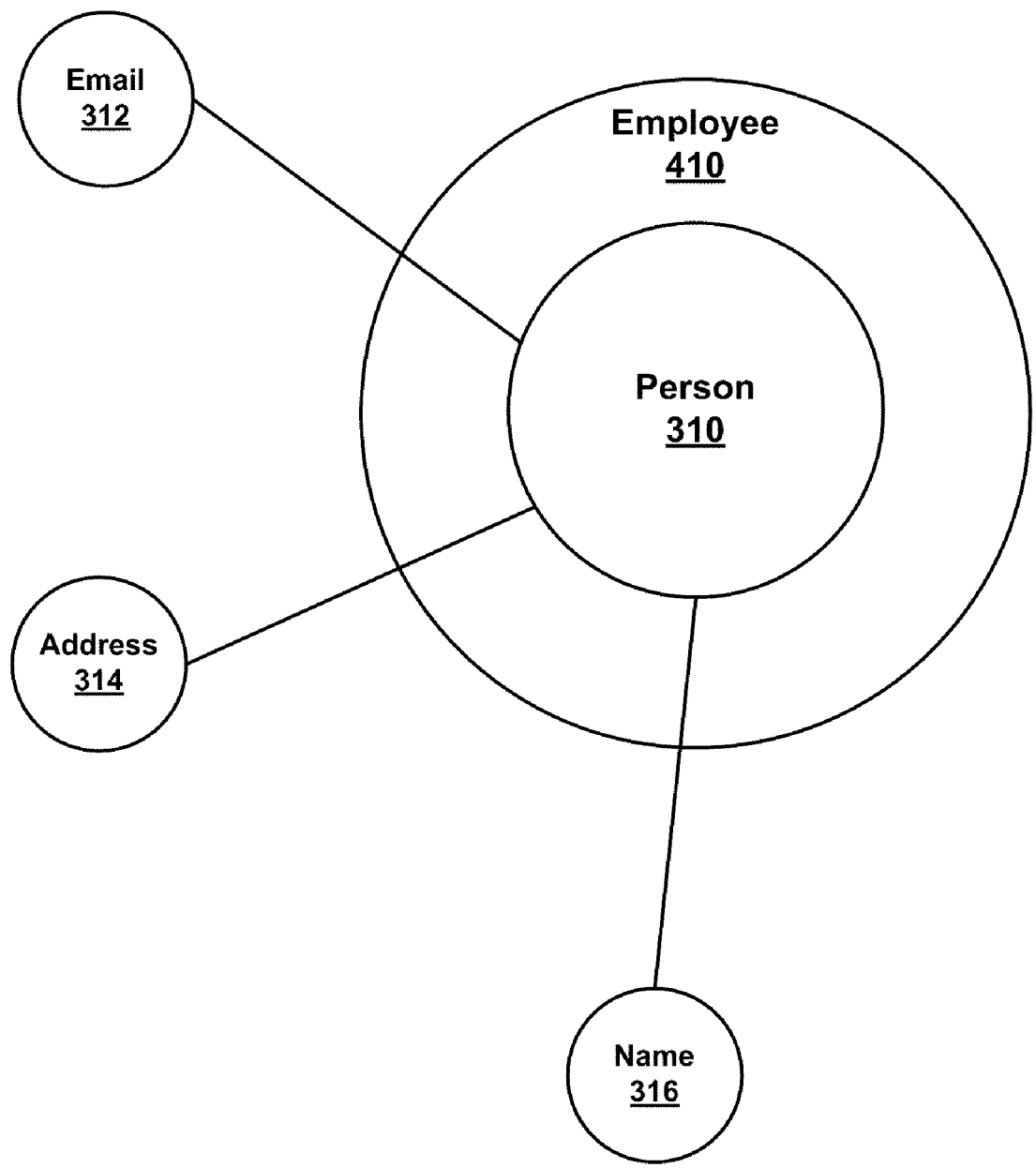
FIG. 4 illustrates a second exemplary view, showing an IS-A relationship between objects, of a molecular object relevance display of a set of enterprise objects (EOs) from an exemplary HCM application according to various embodiments of the invention.
Figure 5:
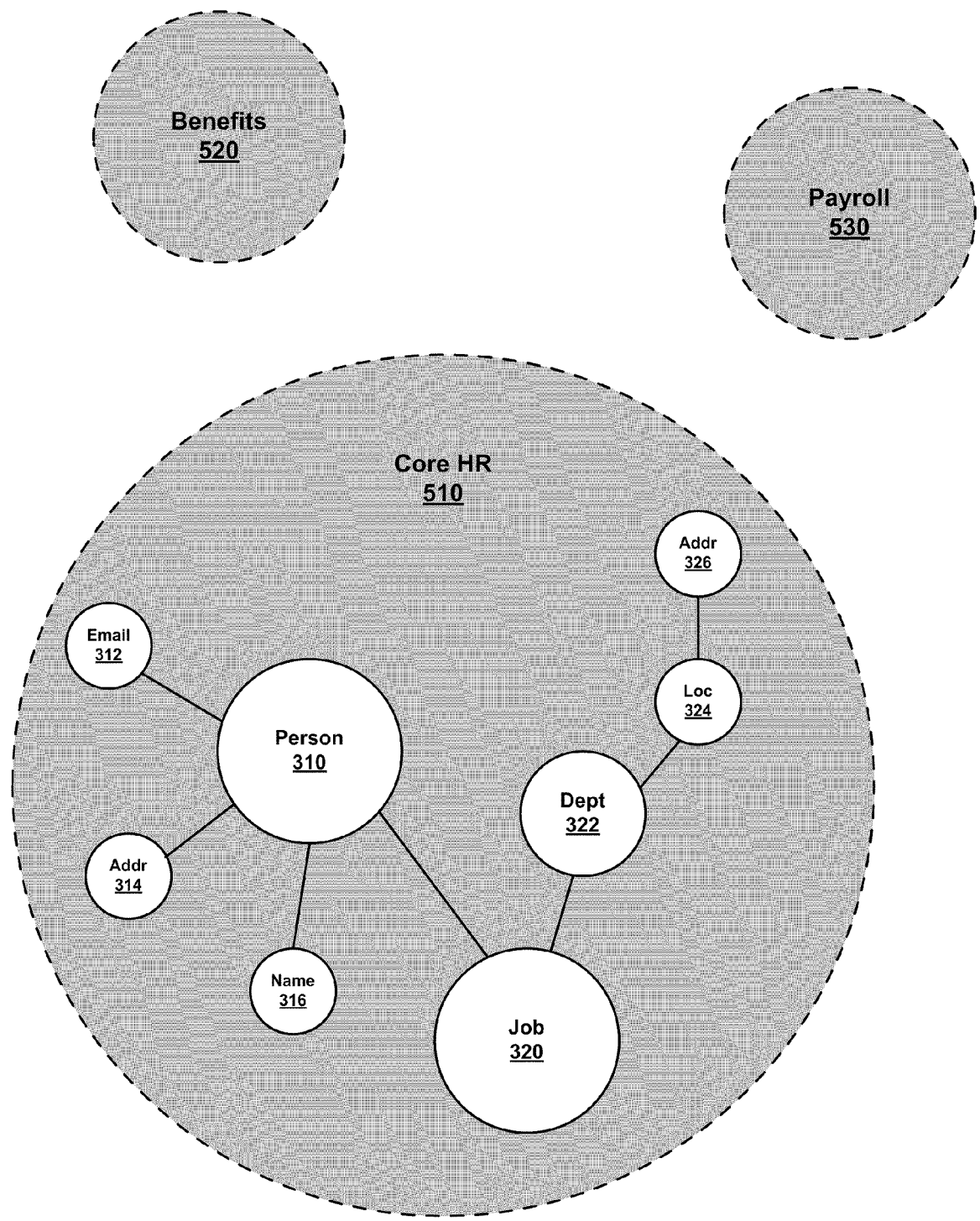
FIG. 5 illustrates a third exemplary view of a multi-dimensional molecular object relevance display of a set of functional groupings of enterprise objects (EOs) from an exemplary HCM application according to various embodiments of the invention.

FIGS. 3, 4, and 5 depict exemplary views, presented for illustration and not for limitation, of a molecular object relevance display 225 according to various embodiments of the invention. In embodiments, the design of a molecular object relevance display is analogous to the design of a display of the molecules and molecular bonds within a chemical compound. In embodiments, the molecules may be displayed in two dimensions (2D) or three dimensions (3D), and a display may be rotated and adjusted to view different portions of the display.

FIG. 3 illustrates an exemplary view of a set of deployed HCM enterprise objects (EOs) from an exemplary HCM application according to various embodiments of the invention. Each illustrated HCM EO is represented as a circle ("molecule"), and each connecting line ("bond") between circles represents a HAS-A relationship (i.e., one object contains an instance of another object) between the objects connected by the line.

In the illustrated display, class Person 310 is associated (i.e., is linked via a HAS-A relationship) with an Email address 312, a location Address 314, a Name 316, and a Job 320. Class Job 320 is associated with a Department 322, which in turn is associated with a Location 324, which in turn is associated with an Address 326. In embodiments, the displayed object "molecules" represent weighted objects, and the size of an object molecule icon is proportional to the number of references to the object (the object's associated relevance value). In the exemplary display view, the Person 310 and Job 320 "molecule" icons have the largest diameters, and thus the display enables these two objects to be identified as the deployed objects which have the greatest number of references.

FIG. 4 illustrates a second exemplary molecular display view of a subset of the EOs within the same exemplary HCM application. This view illustrates depiction of an IS-A relationship between molecular display objects according to various embodiments of the invention. In the illustrated display, the Employee class 410 has an IS-A relationship with the Person class 310 (i.e., Employee 410 is a subclass of class Person 310). The icon of the superclass Person 310 is displayed within the icon of its subclass Employee 410. In alternate embodiments, the icon of a subclass is displayed within the icon of its superclass (the class it extends).

FIG. 5 illustrates a third exemplary molecular display view of a subset of the EOs within the same exemplary HCM application. It is well known in the art that an enterprise application suite may be packaged and sold as a product to be installed and executed on a customer's computing platform. It is common to create functional groupings of deployed application objects, and to configure an application suite product to contain one or more of the functional groupings according to a customer's product requirements. FIG. 5 illustrates an exemplary view of a molecular object relevance display of three functional object groupings (Core HR 510, Benefits 520, and Payroll 530) according to various embodiments of the invention. The displayed EOs (310, 312, 314, 316, 320, 322, 324, and 326) belong to the Core HR functional group 510, and they are rendered in the portion of that functional group that has been selected for viewing by a user. In embodiments, HAS-A relationships between objects belonging to different functional groups may be displayed.

Those skilled in the art will recognize that a variety of design implementations, (such as the use of shape, pattern, and color) for a graphical and/or text display exist, and that the choice of object relevance display design implementation is not critical to the invention.

2. Source Tree Object Relevance Display

As previously described, embodiments of the present invention may enable a developer to make a rapid and efficient identification of deployed objects that are available for re-use in a J2EE application. It is well known in the art that J2EE application development commonly is performed by using a Java interactive development environment (IDE), such as JDeveloper from Oracle International Corporation of Redwood Shores, Calif. An IDE contains an integrated set of development tools such as a code editor and graphical object management tools. A developer using an IDE can create, delete, or edit an application source code object by accessing development tool user interfaces (UIs) provided by the IDE.

Figure 6:
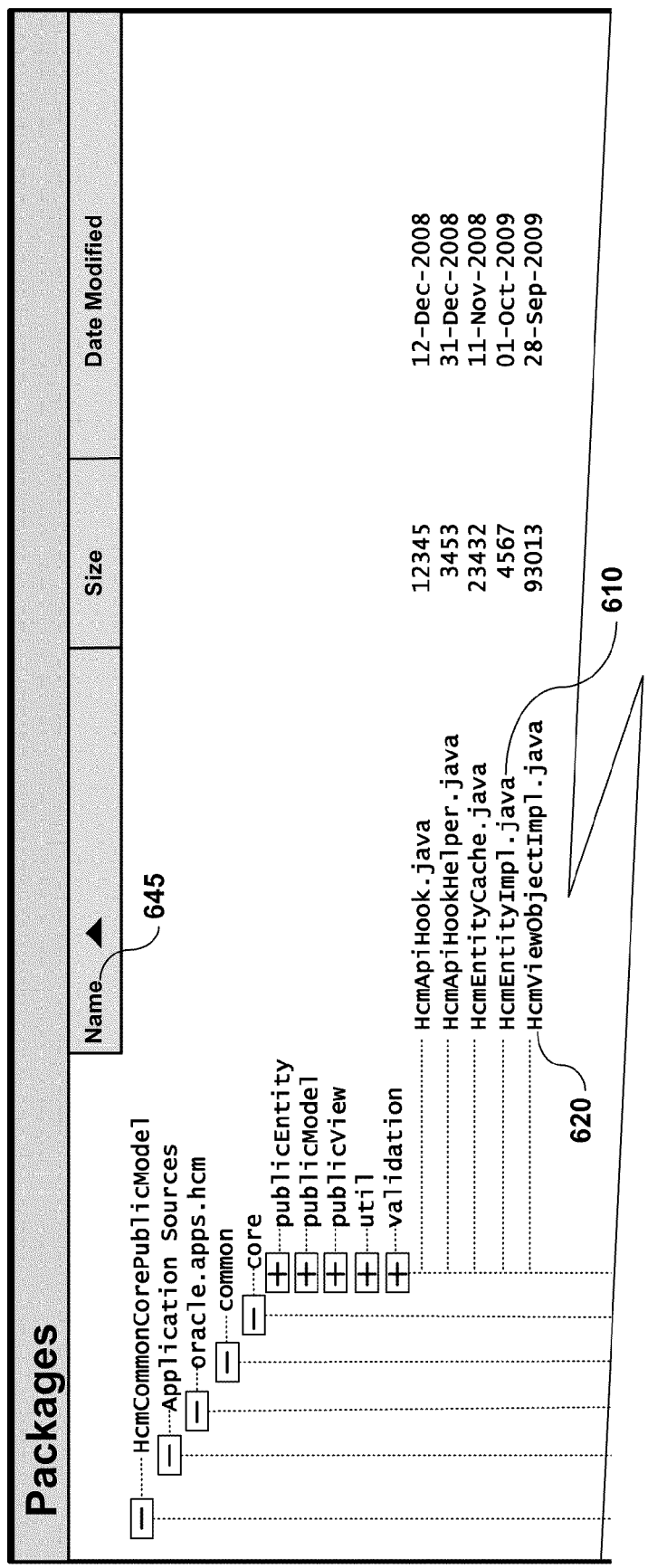
FIG. 6 illustrates a prior art integrated development environment (IDE) display of a Java source code hierarchy tree sorted by name.

FIG. 6 illustrates a portion of an exemplary source code display within a Java IDE. The Java class objects are organized into an expandable functional source tree hierarchy displaying Java packages and objects. The presence of a source tree node's child nodes is indicated by a "+" icon, and if a user selects the "+" icon, the "+" icon becomes a "−" icon and the display is expanded to show the node's child nodes. In the exemplary source tree in FIG. 6, the top level of the hierarchy is a Project (HcmCommonCorePublicModel), which may contain one or more applications. The Java class objects within a Project are organized into a hierarchy of Java packages. In the example, the top level package name is oracle.apps.hcm, which contains one child package (oracle.apps.hcm.common), which contains one child package (oracle.apps.hcm.common.core), which contains five child packages (publicEntity, publicModel, publicView, util, and validation) as well as a set of Java class objects (classes). Each Java source class object corresponds to a text file maintained by the IDE, so every Java source class is displayed in the source tree hierarchy by its class name followed by the ".java" file type. Note that this display is organized similarly to a computer file system directory display well known in the art. Also note that the classes within a package are displayed in alphabetical order by class name, and that the display does not provide information about the Java class hierarchy (i.e., relationships between class objects). A developer can use this IDE display to find an object only if the developer knows the name of the package and file in which the object is stored. In the example, which depicts a set of deployed objects from an exemplary HCM application suite sorted by name 645, the class HCMEntityImpl 610 is a very relevant object (i.e., has many references), because all exemplary HCM application EOs extend this class. The class HCMViewObjectImpl 620, the base class for all HCM view objects (VOs), also is a very relevant object. The relevance of these classes relative to the relevance of the other classes within its package is not evident in the IDE display.

Figure 7:
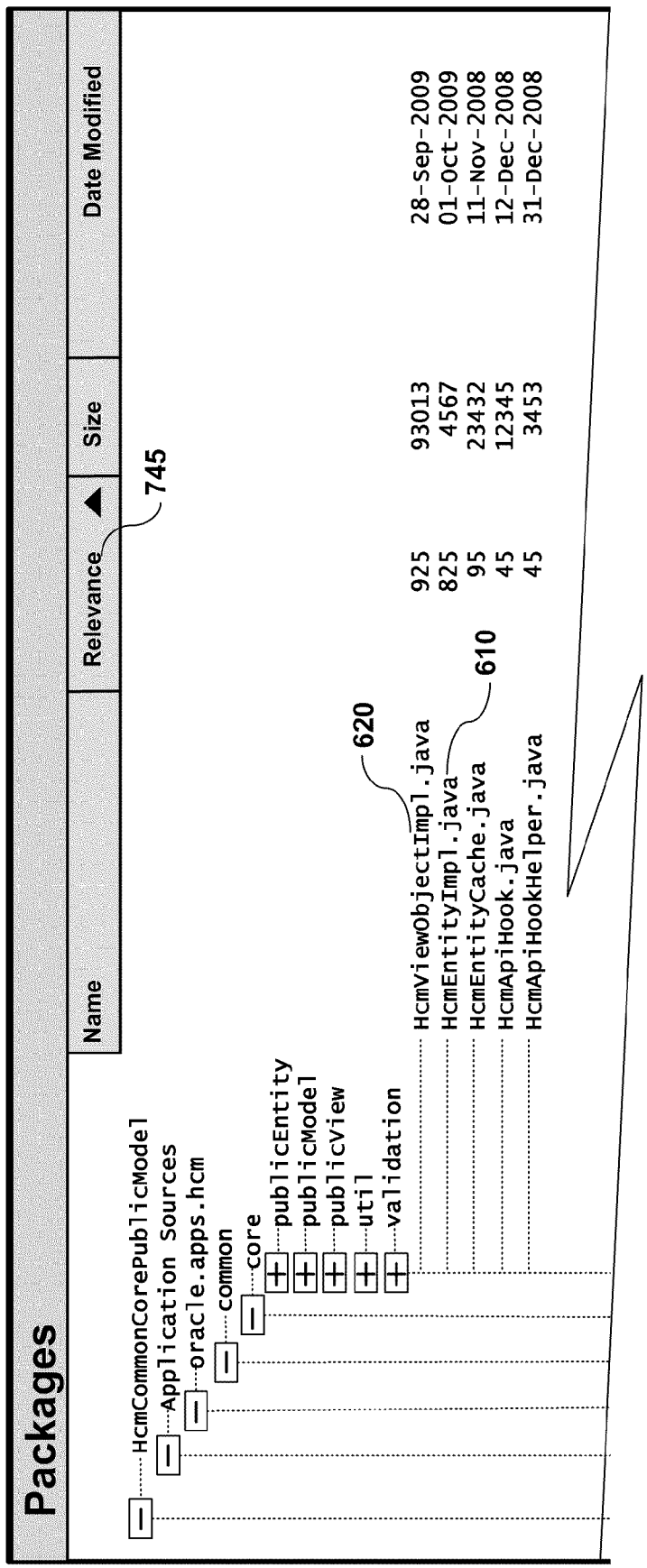
FIG. 7 illustrates an exemplary view of an object relevance display of an exemplary Java source code hierarchy tree sorted by relevance score according to various embodiments of the invention.

FIG. 7 depicts an object relevance display of the IDE source code object tree hierarchy illustrated in FIG. 6 according to various embodiments of the invention. In contrast to the display illustrated in FIG. 6, the object relevance display displays class objects within a package in an order based on their object relevance values 745. Thus, in the object relevance display, the classes HCMViewObjectImpl 620 and HCMEntityImpl 610 are listed first because of their larger number of references (and greater object relevance values). Because of the "V" in the class name, HCMViewObjectImpl 620 would be listed towards the end of the alphabetical listing depicted in FIG. 6. However, in the object relevance display it is listed towards the top of the list of objects in the package because of its relatively large associated object relevance value. In various embodiments, the display of the classes within a package (which is a directory) may be re-configured by a user selection of a class sorting criterion from a set of displayed class file attributes that includes object relevance.

C. Methods for Calculating an Object Relevance Value

The following sections describe embodiments of methods for computing a relevance value for an object. The method embodiments may be implemented in embodiments of object relevance system 100.

Figure 8:
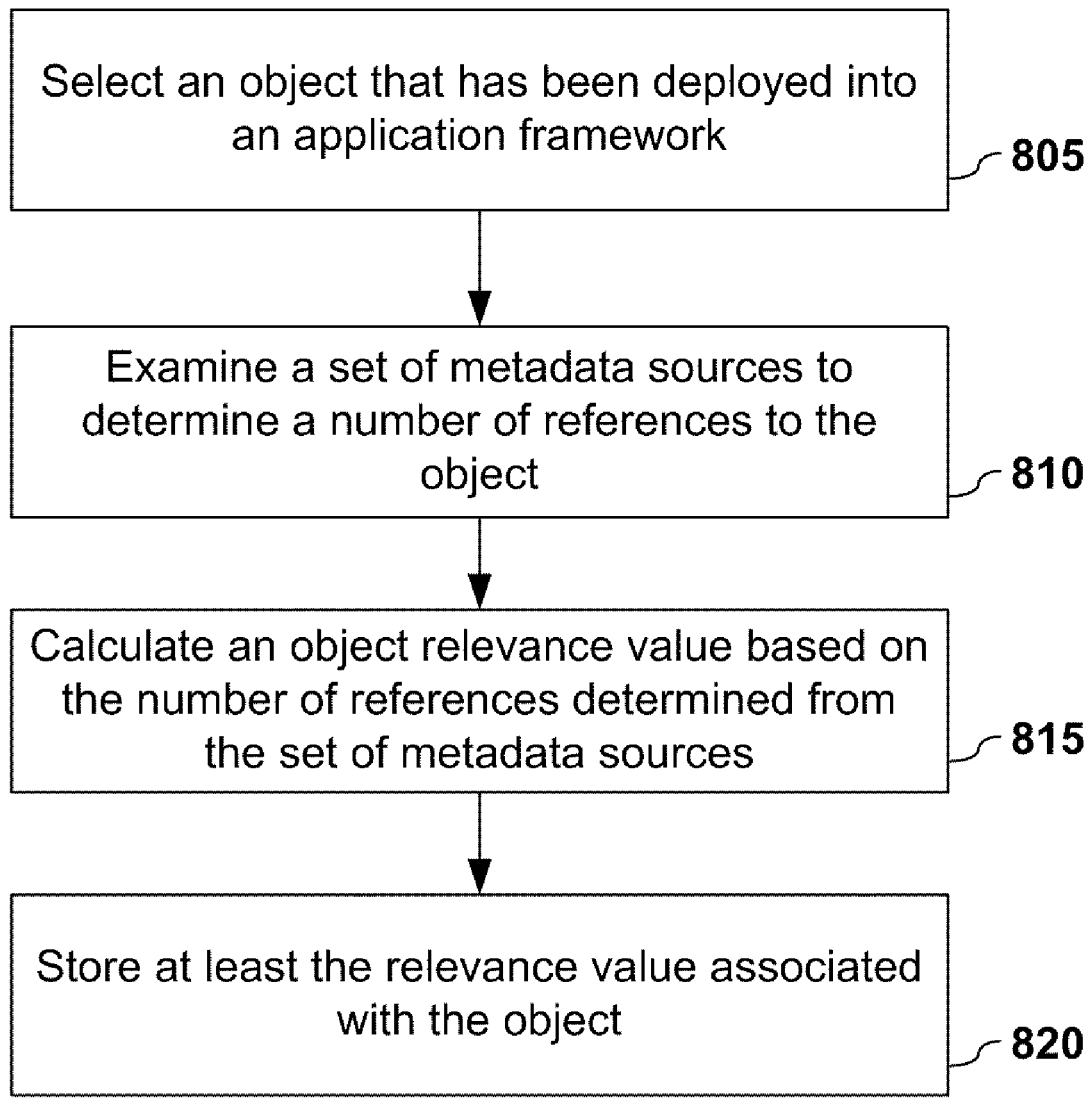
FIG. 8 depicts a first embodiment of a method for computing a relevance value for an object deployed to an application server according to various embodiments of the invention.

1. A First Embodiment of a Method for Calculating a Relevance Value for a Deployed Object FIG. 8 describes a first embodiment of a method 800 for computing a relevance value for an object deployed to an application server, and storing at least the relevance value associated with the object, according to various embodiments of the invention.

As previously described, a J2EE application module contains a set of Java objects that are associated to perform a set of services within a J2EE application framework. To deploy a new application module to an application server within a J2EE application server framework, the application server is provided with an archive file (such as a JAR, WAR, or EAR) containing the application objects, their associated data, and associated configuration data files. The application server then integrates the application module components into the application server framework so that they may be accessed and executed. Typically, integrating an application module into a J2EE application server framework includes updating at least a subset of the application server framework configuration data files that are managed by the application server.

A typical application server manages a large number of deployed application objects, and provides a display of the deployed objects via the application server administrator console user interface. This display focuses on runtime characteristics of the objects (such as how many object instances are deployed, deployment date, and deployment status), and deployed objects are listed alphabetically by name. As previously discussed, an application server administrator console display of deployed objects does not enable a J2EE application developer to discover deployed objects available for reuse during development of new application modules, because the developer is required to know an object's name and characteristics in order to identify it in the list of deployed objects.

In embodiments, the relevance of a selected 805 deployed application object may be determined by calculating the number of references to the object 105. In embodiments, references to the object 105 may be determined by examining 810 a set of metadata sources, such as application framework data configuration files. In embodiments, the configuration data files may be associated with one or more tiers in a multi-tier application framework. Table 1 depicts exemplary metadata sources (from which references may be extracted) within three exemplary configuration data categories according to various embodiments of the invention.

In embodiments, a relevance value associated with the object 105 is calculated 815 as the sum of the references to the object that were extracted from each of the set of metadata sources (See Equation 1). In embodiments, the relevance value associated with the object is be stored 825 in data storage 135, such as a database or data file system deployed on a storage medium, so that it is available for further processing and/or display. In various embodiments, relationship data (such as HAS-A relationships and IS-A relationships) associated with the object may be derived from source files by parsing the class member variables (HAS-A) and/or the inheritance declaration for the class (IS-A), and this information also may be stored in data storage 135.

Figure 9:
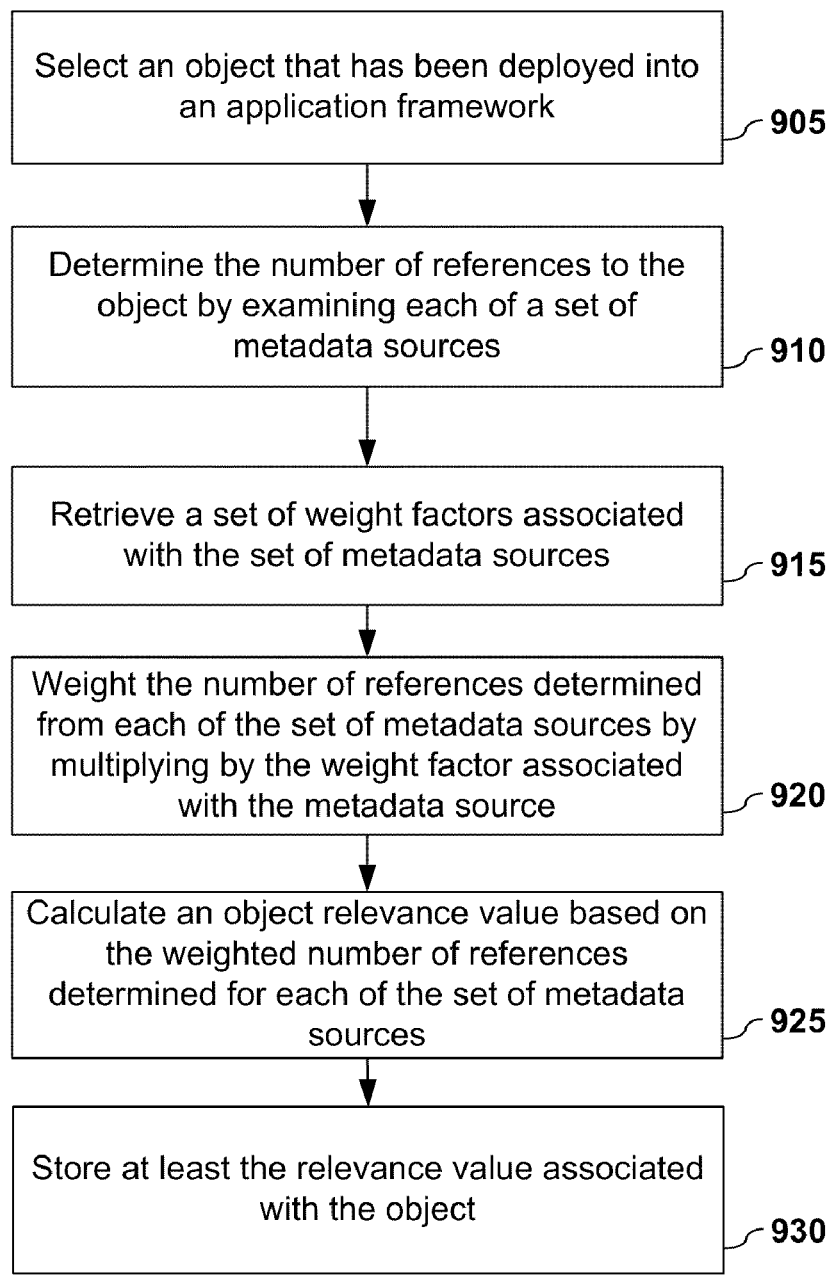
FIG. 9 depicts a first embodiment of a method for computing a relevance value for an object deployed to an application server according to various embodiments of the invention.

2. A Second Embodiment of a Method for Calculating a Relevance Value for a Deployed Object FIG. 9 describes a second embodiment of a method 900 for computing a relevance value for an object deployed to an application server, and storing at least the relevance value associated with the object, according to various embodiments of the invention.

In embodiments, references to a selected 905 deployed object may be determined by examining 910 each of a set of metadata sources, such as application framework data configuration files, in the same way as described for steps 805 and 810 in method 800. In various embodiments, a weight factor associated with each of the set of metadata sources may be retrieved 915 from a weight template 125 comprising a set of ranked metadata sources and their associated weight factors.

The number of references determined for each of the set of metadata sources may be weighted 920 by multiplying by the weight factor associated with the corresponding metadata source.

In embodiments, a relevance value associated with the object 105 is calculated 925 as the sum of the weighted references to the object that were extracted from each of the set of metadata sources (See Equation 2). In embodiments, at least the relevance value associated with the object is be stored 930 in data storage 135 in the same way as described for step 820 in method 800.

3. Method for Calculating a Relevance Value for a Source Object

Figure 10:
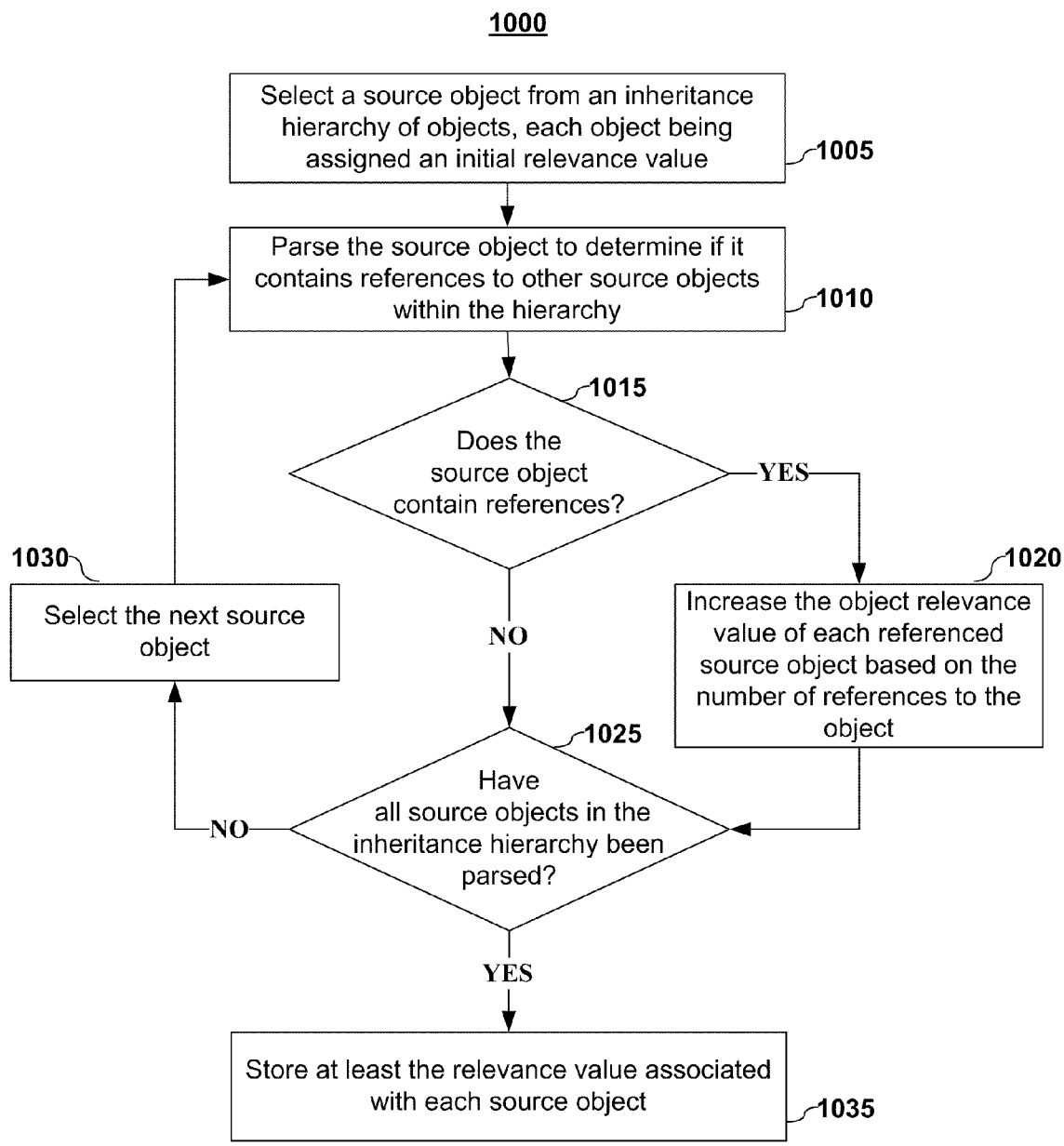
FIG. 10 depicts a method for computing a relevance value for a source object within a source object hierarchy according to various embodiments of the invention.

FIG. 10 depicts a method 1000 for computing a relevance value for a source object within a source object hierarchy according to various embodiments of the invention.

As previously described, J2EE application development commonly is performed by creating, editing, and/or deleting Java source objects. As is well known to those skilled in the art, Java source objects are class objects that are organized into an inheritance hierarchy in which class Object is the root, and where each class within the hierarchy has one superclass and zero or more subclasses.

In embodiments, an object relevance value for a selected source object within an inheritance hierarchy may be based on the number of references to the object from other objects within the hierarchy. In embodiments, each object within the inheritance hierarchy may be parsed to determine how many references to the selected object it contains, and the relevance value associated with the selected object is the total number of references to the object from all of the objects in the hierarchy.

In various embodiments, the number of references to each object within an inheritance hierarchy may be determined by traversing the tree and parsing each object to determine the references it contains. In embodiments, the inheritance hierarchy may be traversed by selecting 1005 a source object based on its position within the inheritance hierarchy. In embodiments, the initially selected object may be the root object of the inheritance hierarchy.

In various embodiments, all objects in the inheritance hierarchy may be assigned an initial relevance value of zero.

In embodiments, a source object may be parsed 1010 in order to determine if it contains references to at least one other source object within the hierarchy. If the object contains references to one or more objects 1015, the object relevance value of each referenced object is increased by a factor based on the number of references to the object. In various embodiments, the object relevance value represents a count of the number of references to an object, and the count is incremented each time a reference to the object is identified. Thus, for example, the Person class in an HCM application may be extended by Employee, ContingentWorker, and Contractor, and the Person object relevance value after examining those subclasses of Person would be three.

If there are remaining source objects in the hierarchy that have not been parsed, a next source object is selected 1030 based on a path through the inheritance hierarchy determined by a traversal algorithm. Exemplary traversal algorithms include breadth-first (search all nodes on a level) and depth-first (search all child nodes until you reach a leaf node). Those skilled in the art will recognize that a variety of algorithms exist for traversing an inheritance hierarchy, and that the choice of algorithm is not critical to the invention. The next source object identified by the traversal algorithm is selected for analysis until all source objects within the inheritance hierarchy have been parsed 1025. In embodiments, at least the relevance values associated with each of the objects are stored 1035 in data storage 135, such as a database or data file system deployed on a storage medium, so that they are available for further processing and/or display.

D. Method for Generating an Object Relevance Display

Figure 11:
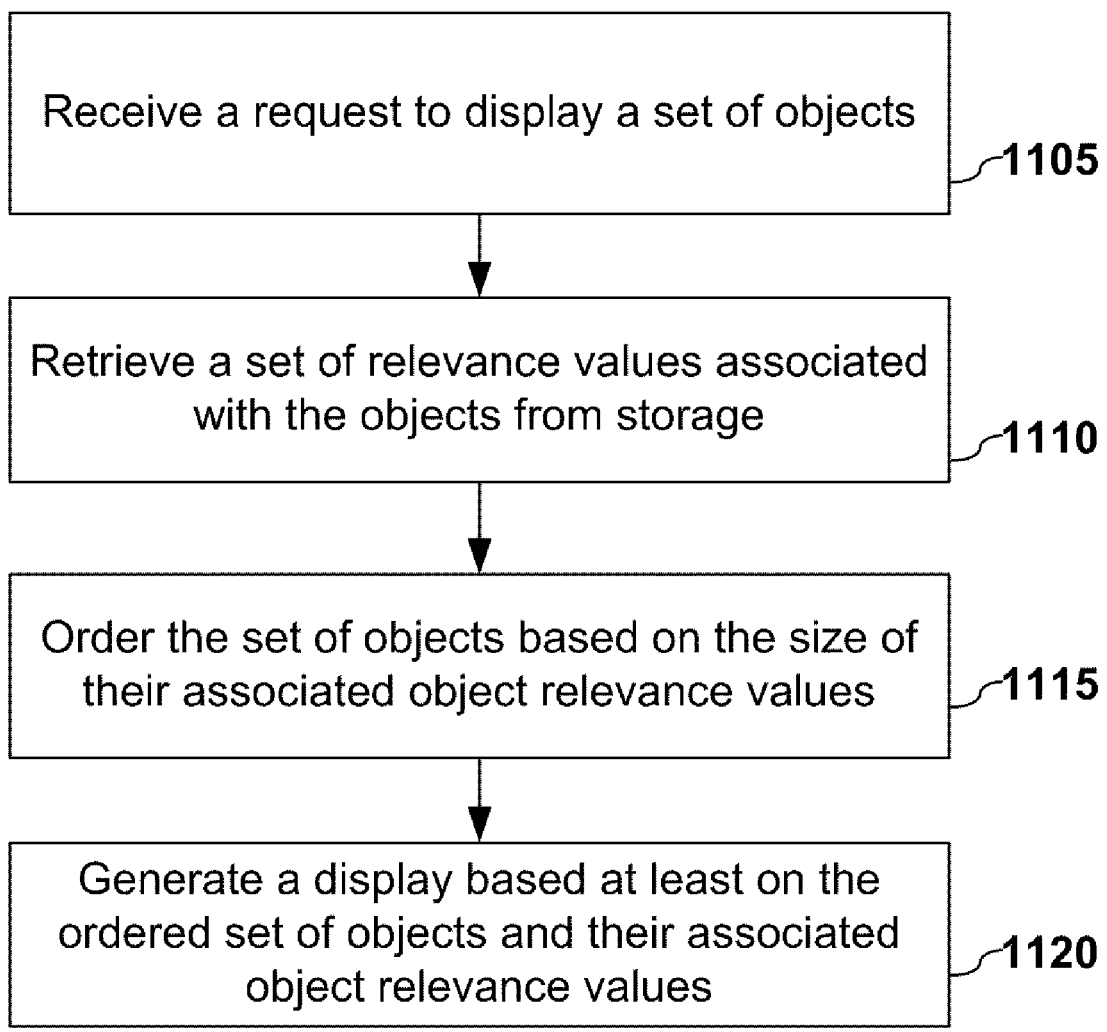
FIG. 11 depicts a method for generating an object relevance display for a set of weighted objects according to various embodiments of the invention.

FIG. 11 depicts a method 1100 for generating an object relevance display for a set of objects according to various embodiments of the invention. Method 1100 may be implemented in embodiments of object relevance display system 200.

In embodiments, an object relevance display request 205 may be received 1105 from a process within an enterprise software platform, such as an application server or an integrated development environment (IDE). In embodiments, the display request 205 specifies a set of objects to be displayed. In embodiments, the relevance values associated with the specified set of objects may be retrieved 1110 from data storage 135.

In embodiments, the retrieved set of objects may be ordered (ranked and/or sorted) 1115 based on the size of their associated relevance values. In embodiments, an object relevance display is generated 1120 using the ranked and/or sorted set of objects and their associated relevance values. In embodiments, the object relevance display also may be based on object relationship data associated with the set of objects (such as HAS-A relationships and IS-A relationships) that also may be retrieved from data storage. For example, in various embodiments, a generated object relevance display may be a molecular display (FIGS. 3, 4, and 5) and/or a hierarchical source tree display (FIG. 7).

E. Computing System Implementations

It shall be noted that the present invention may be implemented in any instruction-execution/computing device or system capable of processing data. The present invention may also be implemented into other computing devices and systems. Furthermore, aspects of the present invention may be implemented in a wide variety of ways including software, hardware, firmware, or combinations thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

Figure 12:
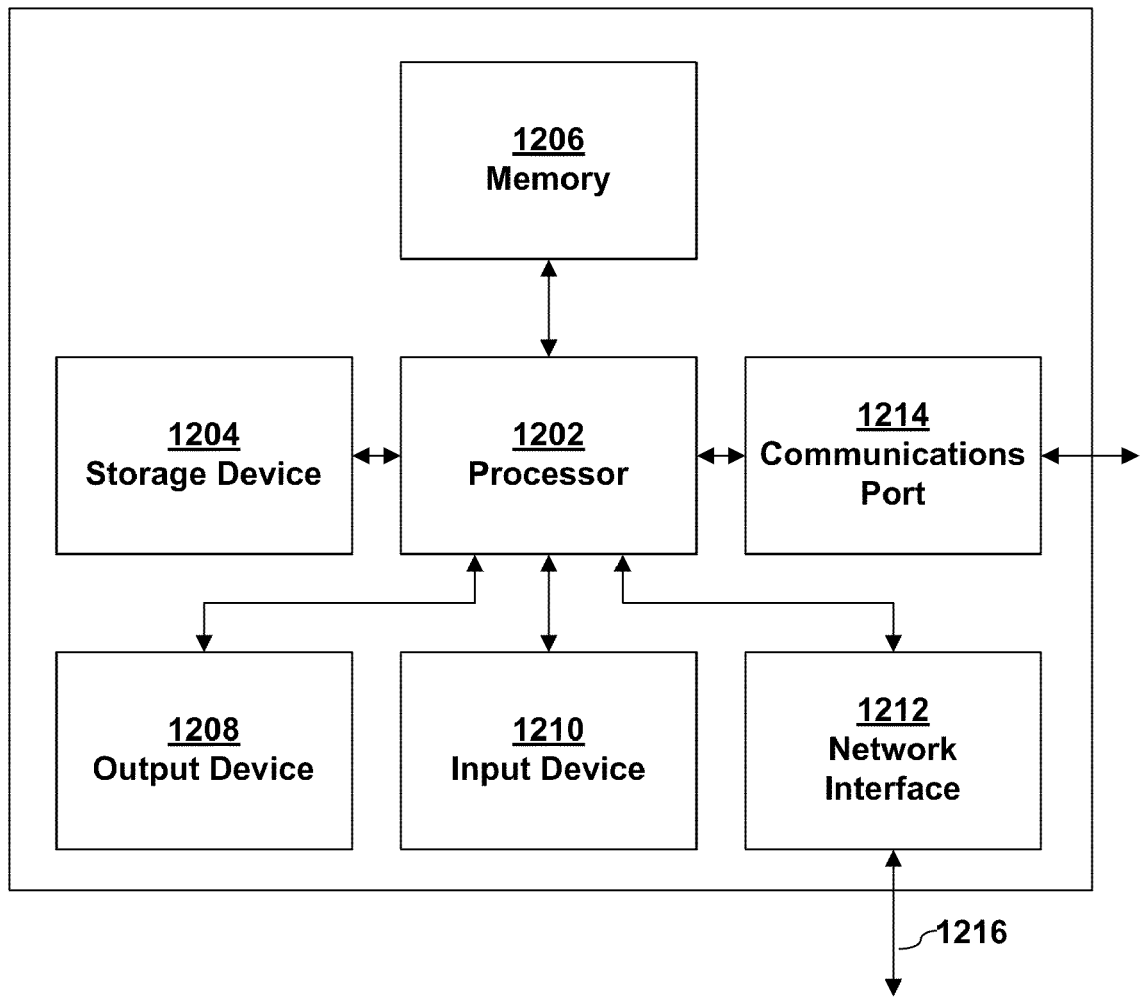
FIG. 12 depicts a block diagram of a computing system according to various embodiments of the invention.

FIG. 12 depicts a functional block diagram of an embodiment of an instruction-execution/computing device 1200 that may implement or embody embodiments of the present invention. As illustrated in FIG. 12, a processor 1202 executes software instructions and interacts with other system components. In an embodiment, processor 1202 may be a general purpose processor such as (by way of example and not limitation) an AMD processor, an INTEL processor, a SUN MICROSYSTEMS processor, or a POWERPC compatible-CPU, or the processor may be an application specific processor or processors. A storage device 1204, coupled to processor 1202, provides long-term storage of data and software programs. Storage device 1204 may be a hard disk drive and/or another device capable of storing data, such as a magnetic or optical media (e.g., diskettes, tapes, compact disk, DVD, and the like) drive or a solid-state memory device. Storage device 1204 may hold programs, instructions, and/or data for use with processor 1202. In an embodiment, programs or instructions stored on or loaded from storage device 1204 may be loaded into memory 1206 and executed by processor 1202. In an embodiment, storage device 1204 holds programs or instructions for implementing an operating system on processor 1202. In one embodiment, possible operating systems include, but are not limited to, UNIX, AIX, LINUX, Microsoft Windows, and the Apple MAC OS. In embodiments, the operating system executes on, and controls the operation of, the computing system 1200.

An addressable memory 1206, coupled to processor 1202, may be used to store data and software instructions to be executed by processor 1202. Memory 1206 may be, for example, firmware, read only memory (ROM), flash memory, non-volatile random access memory (NVRAM), random access memory (RAM), or any combination thereof. In one embodiment, memory 1206 stores a number of software objects, otherwise known as services, utilities, components, or modules. One skilled in the art will also recognize that storage 1204 and memory 1206 may be the same items and function in both capacities. In an embodiment, one or more of the components of FIGS. 1A, 1B, and 2 may be modules stored in memory 1204, 1206 and executed by processor 1202.

In an embodiment, computing system 1200 provides the ability to communicate with other devices, other networks, or both. Computing system 1200 may include one or more network interfaces or adapters 1212, 1214 to communicatively couple computing system 1200 to other networks and devices. For example, computing system 1200 may include a network interface 1212, a communications port 1214, or both, each of which are communicatively coupled to processor 1202, and which may be used to couple computing system 1200 to other computer systems, networks, and devices.

In an embodiment, computing system 1200 may include one or more output devices 1208, coupled to processor 1202, to facilitate displaying graphics and text. Output devices 1208 may include, but are not limited to, a display, LCD screen, CRT monitor, printer, touch screen, or other device for displaying information. Computing system 1200 may also include a graphics adapter (not shown) to assist in displaying information or images on output device 1208.

One or more input devices 1210, coupled to processor 1202, may be used to facilitate user input. Input device 1210 may include, but are not limited to, a pointing device, such as a mouse, trackball, or touchpad, and may also include a keyboard or keypad to input data or instructions into computing system 1200.

In an embodiment, computing system 1200 may receive input, whether through communications port 1214, network interface 1212, stored data in memory 1204/1206, or through an input device 1210, from a scanner, copier, facsimile machine, or other computing device.

In embodiments, computing system 1200 may include one or more databases, some of which may store data used and/or generated by programs or applications. In embodiments, one or more databases may be located on one or more storage devices 1204 resident within a computing system 1200. In alternate embodiments, one or more databases may be remote (i.e. not local to the computing system 1200) and share a network 1216 connection with the computing system 1200 via its network interface 1214. In various embodiments, a database may be a relational database, such as an Oracle database, that is adapted to store, update, and retrieve data in response to SQL-formatted commands.

One skilled in the art will recognize no computing system is critical to the practice of the present invention. One skilled in the art will also recognize that a number of the elements described above may be physically and/or functionally separated into sub-modules or combined together.

It shall be noted that embodiments of the present invention may further relate to computer products with a computer-readable medium that have computer code thereon for performing various computer-implemented operations. The media and computer code may be those specially designed and constructed for the purposes of the present invention, or they may be of the kind known or available to those having skill in the relevant arts. Examples of computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a computer. Examples of program modules include libraries, programs, routines, objects, components, and data structures. In distributed computing environments, program modules may be physically located in settings that are local, remote, or both.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

What is claimed is:

1. A computer program product stored on at least one non-transitory computer-readable storage medium storing one or more sequences of instructions, wherein execution of the one or more sequences of instructions by one or more processors causes the one or more processors to execute a computer-implemented method for generating a relevance value associated with an object selected from a set of objects, the method comprising:

examining a set of metadata sources to determine a number of references to the object from each of the set of metadata sources;

calculating a relevance value based on a number of references to the object determined from the set of metadata sources, wherein the set of metadata sources is ranked according to one or more priority factors, and calculating the relevance value comprises associating a weight factor with each of the set of metadata sources, calculating a weighted number of references for each of the set of metadata sources by multiplying the number of references determined from a metadata source by the weight factor associated with the metadata source, and calculating the relevance value based on a weighted number of references to the object determined from the set of metadata sources; and storing the relevance value associated with the object in data storage.

2. The computer program product of claim 1 wherein the set of objects is deployed to an application server framework, and the set of metadata sources are within the application server framework.

3. The computer program product of claim 2 wherein the application server framework is a J2EE framework, and the set of metadata sources comprises database descriptors, application data framework (ADF) entity descriptors, runtime configuration descriptors, and source code.

4. The computer program product of claim 1 wherein the weight factor is retrieved from a stored weights template comprising the ranked set of metadata sources and their corresponding weight factors.

5. The computer program product of claim 4 wherein the stored weights template is configurable.

6. The computer program product of claim 1 wherein the set of objects are source objects within an object inheritance hierarchy.

7. The computer program product of claim 6 wherein the set of metadata sources are the source objects within the object inheritance hierarchy, and determining the number of references to a source object within the inheritance hierarchy comprises examining each of the source objects.

8. A computer processing system for generating an object relevance display, the system comprising:

a computer, including a non-transitory computer readable storage memory and an object ordering processor, wherein the object ordering processor, in response to receiving an object relevance display request comprising a set of objects to display, retrieves a set of stored relevance values associated with the set of objects and sorts the set of objects according to their associated relevance values, wherein a relevance value is calculated based on the number of references to an object wherein calculating each relevance value comprises associating a weight factor with each of a set of metadata sources, calculating a weighted number of references for each of the set of metadata sources by multiplying the number of references determined from a metadata source by the weight factor associated with the metadata source, and calculating the relevance value based on a weighted number of references to the object determined from the set of metadata sources; and a display generator that generates the object relevance display in response to receiving the sorted set of objects, the object relevance display comprising a set of icons representing the sorted set of objects and their associated relevance values.

9. The computer processing system of claim 8 wherein the object relevance display request further comprises a set of filtering parameters, and the object ordering processor selects a subset of the objects to display based on the set of filtering parameters.

10. The computer processing system of claim 8 wherein the set of icons are graphic icons that indicate magnitudes of the relevance values corresponding to the sorted set of objects.

11. The computer processing system of claim 10 wherein magnitude of a relevance value associated with an object within the set of objects is indicated by at least one attribute of a graphic icon representing the object.

12. The computer processing system of claim 10 wherein the object relevance display further comprises identification of HAS-A relationships among a subset of the objects by indicating connections between the graphic icons corresponding to the subset of the objects.

13. The computer processing system of claim 8 wherein the set of icons are text icons that indicate magnitudes of the relevance values corresponding to the sorted set of objects, and the set of icons are displayed in a revolving cloud that is moved and rotated in response to interaction with a user.

14. The computer processing system of claim 8 wherein the object relevance display is a tree hierarchy and the set of icons are text icons that are displayed in a list in descending order of magnitudes of the relevance values associated with the sorted set of objects.

15. A computer processing hardware system for generating a stored relevance value associated with an object selected from a set of objects, the system comprising:
- a metadata extractor that examines a set of metadata sources to determine a number of references to the object from each of the set of metadata sources; and
- a relevance value calculator that calculates a relevance value based on a number of references to the object determined from the set of metadata sources, and stores the relevance value associated with the object in data storage, wherein the set of metadata sources is ranked according to one or more priority factors, and calculating the relevance value comprises
- associating a weight factor with each of the set of metadata sources,
- calculating a weighted number of references for each of the set of metadata sources by multiplying the number of references determined from a metadata source by the weight factor associated with the metadata source, and
- calculating the relevance value based on a weighted number of references to the object determined from the set of metadata sources.

16. The computer processing system of claim 15 wherein the metadata extractor comprises:
- an object entity parser that determines references to the object by analyzing metadata from an application data framework (ADF) entity;
- a descriptor parser that determines references to the object by analyzing metadata from runtime code configuration descriptors;
- a database parser that determines references to the object by analyzing metadata from a database configuration; and
- a source code parser that determines references to an object by analyzing metadata by parsing source code object definitions.

17. The computer processing system of claim 15 wherein the weight factor is retrieved from a stored weights template comprising the ranked set of metadata, sources and their corresponding weight factors.

18. The computer processing system of claim 15 wherein the set of objects are source objects within an object inheritance hierarchy, and determining the number of references to a source object within the object inheritance hierarchy comprises examining the set of source objects.

* * * * *

UNITED STATES PATENT AND TRADEMARK OFFICE
CERTIFICATE OF CORRECTION

PATENT NO. : 8,266,153 B2  
APPLICATION NO. : 12/577001  
DATED : September 11, 2012  
INVENTOR(S) : Hui et al.

Page 1 of 1

It is certified that error appears in the above-identified patent and that said Letters Patent is hereby corrected as shown below:

In column 4, line 45, delete "invention" and insert -- invention. --, therefor.

In column 20, line 15, in Claim 17, delete "metadata," and insert -- metadata --, therefor.

Signed and Sealed this
First Day of January, 2013

David J. Kappos
*Director of the United States Patent and Trademark Office*